United States Patent
Karer et al.

(10) Patent No.: US 7,534,341 B2
(45) Date of Patent: May 19, 2009

(54) DISCONTINUOUS METERING OF CATALYSTS AND PROCESS AUXILLIARIES INTO A GAS-PHASE FLUIDIZED-BED REACTOR

(75) Inventors: Rainer Karer, Kaiserslautern (DE); Kaspar Evertz, Sulzbach/Taunus (DE); Peter Kölle, Köln-Rodenkirchen (DE); Hans-Jacob Feindt, Flemington, NJ (US)

(73) Assignee: Basell Polyolefine GmbH, Wesseling (DE)

( * ) Notice: Subject to any disclaimer, the term of this patent is extended or adjusted under 35 U.S.C. 154(b) by 637 days.

(21) Appl. No.: 10/552,853

(22) PCT Filed: Apr. 15, 2004

(86) PCT No.: PCT/EP2004/003933

§ 371 (c)(1), (2), (4) Date: Oct. 12, 2005

(87) PCT Pub. No.: WO02/38629

PCT Pub. Date: May 16, 2002

(65) Prior Publication Data

US 2007/0037935 A1 Feb. 15, 2007

Related U.S. Application Data

(60) Provisional application No. 60/476,334, filed on Jun. 6, 2003.

(30) Foreign Application Priority Data

Apr. 16, 2003 (DE) .................. 103 17 533

(51) Int. Cl.
*C10G 35/00* (2006.01)
*C10G 35/10* (2006.01)

(52) U.S. Cl. ............... 208/146; 208/152; 208/153; 208/164; 208/176

(58) Field of Classification Search ........... 422/139, 422/145, 116; 208/146, 176, 153, 152, 164
See application file for complete search history.

(56) References Cited

U.S. PATENT DOCUMENTS 3,876,602 A * 4/1975 Calvert et al. ............... 526/86

(Continued)

FOREIGN PATENT DOCUMENTS

DE         19958604         6/2001

(Continued)

*Primary Examiner*—Walter D Griffin
*Assistant Examiner*—Huy-Tram Nguyen
(74) *Attorney, Agent, or Firm*—Shao-Hua Guo (57) ABSTRACT

Method of metering at least one solid, particulate catalyst into a reactor containing a fluidized bed (11) of particles in an at least partly gaseous medium, in which the catalyst is metered discontinuously at prescribed time intervals into the fluidized bed (11) at at least one metering point (10). According to the present invention, a fluid stream is firstly introduced into the reactor (5) so that a region having a reduced particle density is formed in the fluidized bed (11) around the metering point (10) and the catalyst is subsequently metered into this region. As a result of the prior introduction of a fluid stream ("preblowing") before the actual introduction of the catalyst, the catalyst can penetrate significantly deeper into the fluidized bed from the metering point due to the reduced particle density and is dispersed better.

12 Claims, 5 Drawing Sheets

U.S. PATENT DOCUMENTS

| | | | |
|---|---|---|---|
| 4,238,453 A | 12/1980 | Van den Bossche | 422/131 |
| 4,764,056 A * | 8/1988 | Zentgraf et al. | 406/68 |
| 5,026,795 A * | 6/1991 | Hogan | 526/74 |
| 6,088,934 A | 7/2000 | Newton | 34/360 |
| 6,413,477 B1 * | 7/2002 | Govoni et al. | 422/131 |

FOREIGN PATENT DOCUMENTS

| | | |
|---|---|---|
| EP | 0226935 | 7/1987 |
| EP | 0475603 | 3/1992 |
| EP | 0089691 | 9/1993 |
| EP | 0571826 | 12/1993 |
| EP | 0811637 | 12/1997 |
| EP | 0238629 | 5/2002 |

\* cited by examiner

DISCONTINUOUS METERING OF CATALYSTS AND PROCESS AUXILLIARIES INTO A GAS-PHASE FLUIDIZED-BED REACTOR

This application is the U.S. national phase of International Application PCT/EP2004/003933, filed Apr. 15, 2004, claiming priority to German Patent Application 10317533.4 filed Apr. 16, 2003, and the benefit under 35 U.S.C. 119(e) of U.S. Provisional Application No. 60/476,334, filed Jun. 6, 2003; the disclosures of International Application PCT/EP2004/003933, German Patent Application 10317533.4 and U.S. Provisional Application No. 60/476,334, each as filed, are incorporated herein by reference.

The present invention relates to a method of metering at least one solid, particulate catalyst and/or process auxiliary into a reactor containing a fluidized bed of particles in an at least partly gaseous medium, in which the catalyst and/or process auxiliary is introduced discontinuously at prescribed time intervals into the fluidized bed at at least one metering point. A polymerization process for preparing ethylene or propene homopolymers or copolymers and an apparatus for carrying out the process are also provided.

Gas-phase polymerization processes are economical processes for the polymerization of ethene and propene or for the copolymerization of ethene or propene with other $C_2$-$C_8$-α-olefins. Such gas-phase polymerization processes can be configured as, in particular, gas-phase fluidized-bed processes in which the polymer particles are kept in suspension by means of a suitable gas stream. Processes of this type are described, for example, in EP-A-0 475 603, EP-A-0 089 691 and EP-A-0 571 826.

To carry out the polymerization reaction, a catalyst and possibly a cocatalyst is/are required. The catalyst has to be fed into the fluidized bed in some way. Continuous and discontinuous methods are customary for this purpose.

EP 226 935 B1 describes, for example, a discontinuous catalyst metering apparatus in which a shaft which can be rotated alternately by 180° has two depressions which are located on opposite sides and take up the catalyst on the side facing the reservoir unit and, after rotation, release it again on the side facing the valve unit, i.e. the interior of the reactor. During metering, an amount of catalyst corresponding to the volume of the depression and the rotational frequency of the shaft is metered into the reactor by means of the pressurized inert gas.

A disadvantage of this metering method is that a region of very high catalyst concentration is formed at the metering point directly after introduction of the catalyst into the fluidized bed, which in the case of highly active catalysts leads to formation of polymer particles having a high surface temperature (hot spots). These hot spots can conglutinate to form lumps or lead to deposits on the reactor wall or on the temperature probes. Lumps or deposits falling off the reactor wall can block the outlet or be the cause of a big pellet. In both cases, the reactor has to be shut down. Deposits on temperature probes cause false indication of high temperatures, which likewise leads to shutdown of the reactor.

EP 811 637 B1 describes a method of preventing liquid catalysts from depositing on polymer particles already present in the reactor and leading, as a result of increased polymerization, to oversize particles which can no longer be fluidized. Deposition on the polymer particles is prevented by the liquid catalyst present in a gas being surrounded by a further gas which keeps the particles of the fluidized bed away from the region of the fluidized bed into which the liquid catalyst is sprayed as fine droplets. While in the case of introduction of liquid catalysts, the formation of new particle nuclei and the control of the size of the particle nuclei to be formed are the main concerns, in the case of solid, particulate catalysts very good distribution of the catalyst particles in the fluidized bed is the most important issue.

It is an object of the present invention to overcome the abovementioned disadvantages of the prior art in the introduction of solid, particulate catalysts and to provide a method and an apparatus by means of which these high local catalyst concentrations can be avoided in the metered addition.

We have found that this object is achieved in the method of the present invention of metering at least one solid, particulate catalyst and/or process auxiliary into a reactor containing a fluidized bed of particles in an at least partly gaseous medium, in which the catalyst and/or process auxiliary is metered discontinuously at prescribed time intervals into the fluidized bed at at least one metering point, by a fluid stream in each case being introduced into the reactor so that a region having a reduced particle density can form in the fluidized bed around the metering point or points and the catalyst or catalysts and/or process auxiliary or process auxiliaries is subsequently metered into this region.

In the following, metering will be referred to as a metering of catalysts in the interests of simplification, but this is in each case also intended to encompass the metering of process auxiliaries alone or in combination with the catalyst.

As a result of the prior continuous or discontinuous introduction of a liquid stream ("preblowing") before the actual metered addition of the catalyst ("metering"), the catalyst can, starting from one metering point, penetrate significantly deeper into the fluidized bed due to the reduced particle density. In this way, the catalyst is distributed significantly better in the reactor, particularly in the radial direction, so that the risk of formation of high local catalyst concentrations is significantly reduced. For the purposes of the method of the present invention, it is important that the particle-reduced region in the fluidized bed is formed first and the catalyst is then metered into this region, while simultaneous introduction of the fluid stream and the catalyst into the reactor would not give the successful result according to the present invention.

The method is particularly useful for metering a catalyst into a fluidized-bed reactor for the preparation of polymers, in particular polyolefins, without being restricted to this application.

Rather, the method can be employed generally for all fluidized-bed processes in which a catalyst has to be metered very uniformly into a fluidized bed of reaction mixture.

The catalyst which can be used for metering according to the present invention is not restricted to a particular type of catalyst, but it can be applied generally to all known catalysts which are suitable for metering into a gas-phase fluidized bed. The only prerequisite is that the catalysts are in a form which make metered addition possible. They are preferably supported or unsupported catalysts which are in the form of free-flowing solids.

Further preference is given to the use of a solid, free-flowing catalyst which is suitable for the polymerization of α-olefins. Possible catalysts are all known catalysts as are customarily used for (co)polymerization of ethylene and propene, i.e., for example, Ziegler-Natta catalysts, chromium catalysts or metallocene catalysts. These catalysts, including necessary or advantageous cocatalysts and activators, are known to those skilled in the art. These catalysts can also be used together with metal alkyls, in particular aluminum alkyls, which serve as cocatalysts and/or as scavengers for impurities. These catalysts are preferably used in supported form, for example on support materials such as inorganic oxides (e.g. MgO, or silica gel), $MgCl_2$, magnesium ethoxide or organic polymers (e.g. polyethylene particles). Preference is given to application to silica gel, $MgCl_2$ or MgO as support. However, the catalysts can also be metered into the reactor in unsupported solid form. Other additives as are known to those skilled in the art can also be used in the polymerization process of the present invention. The use of additives which reduce electrostatic charging of the polymer particles in the reactor has been found to be particularly advantageous. The use of an antistatic such as Costelan AS 100 (supplier: H. Costenoble GmbH & Co KG, Germany) is particularly helpful. The particle size of the catalysts is usually from 5 to 200 µm, preferably from 20 to 80 µm.

The process auxiliary or auxiliaries which can be used for the metering method of the present invention is, according to the present invention, likewise not restricted to a particular type of process auxiliary but encompasses all known process auxiliaries which are advantageous in the reaction carried out in the reactor and are suitable for metering into a gas-phase fluidized bed. The only proviso is that the process auxiliaries are in a form which makes metering possible. In the case of process auxiliaries which are suitable for polymerization, in particular of polyolefins, these can be, for example, alkyl compounds such as triethylaluminum, antistatics, catalyst poisons and the like, without being restricted thereto. Particular preference is given to making the process auxiliaries suitable for metering by applying them to an inert support. It is also possible to meter process auxiliaries and catalysts simultaneously.

According to the present invention, the fluid stream can in principle be formed by any fluid or fluid mixture which is inert during the metered addition and is in the gaseous state at equilibrium under the pressure, the temperature and the composition of matter prevailing in the reactor. The fluid is preferably a permanent gas. For olefin polymerization, particular preference is given to, for example, nitrogen, methane, ethane or the like, so that there is no risk of premature polymerization in the feed lines. It can also be particularly useful to employ any gas which is in the liquid state on being fed in but vaporizes immediately in the reactor under the conditions prevailing there. Particular preference is in this case given to the use of propane which has been liquefied under pressure and is depressurized and thus vaporized on introduction into the reactor. Further preference is given to metered addition using propane which is in the supercritical state in the metering apparatus and is depressurized into the reactor. A mixture of various fluids, in particular a permanent gas and a gas liquified under pressure, can likewise be advantageous, depending on the type of fluidized bed or of the catalyst to be metered in.

A gas-phase fluidized bed usually comprises particles kept in suspension in the gas phase by means of a gas stream. According to the present invention, the fluidized bed may comprise not only a gas or a gas mixture but also condensed material, as long as this does not adversely affect the formation of the region having a reduced particle density.

The type of particles from which the fluidized bed is formed plays only a subordinate role for application of the method of the present invention, as long as a region having a substantially reduced particle density or even an essentially particle-free region which allows the catalyst to penetrate relatively deeply into the fluidized bed can be formed by means of the preblowing. The method of the present invention can also be applied to all types of fluidized bed, regardless of whether these are in a turbulent, laminar or other operating state.

The method of the present invention is preferably used for metering catalysts and/or process auxiliaries into a fluidized bed comprising solid particles, in particular polymer particles. Particular preference is given to metering catalysts and/or process auxiliaries into a gas-phase fluidized-bed reactor for olefin polymerization, as is described in detail in, for example, EP-A-0 475 603, EP-A-0 089 691 or EP-A-0 571 826. The method of the present invention can also be used analogously in stirred gas-phase polymerization processes.

The degree to which the particle density has to be reduced in order to obtain an improvement in the metered addition depends greatly on the particle density of the fluidized bed and on the mass and size of the catalyst particles. Under the conditions customary for olefin polymerization, the particle densities in the fluidized bed are usually from about 0.2 to 0.4 $g/cm^3$. The particle density in the density-reduced region of the fluidized bed should be reduced below 0.15 $g/cm^3$ to achieve improved distribution of the catalyst particles. Preference is given to generating a particle density of below 0.1 $g/cm^3$, more preferably below 0.05 $g/cm^3$, in particular below 0.01 $g/cm^3$, by means of the fluid. However, generation of an essentially particle-free region into which the catalyst is then metered is most preferred, since the penetration depth into the fluidized bed and the distribution in the fluidized bed is particularly good in this case. In general, the distribution of the catalyst in the fluidized bed is better, the freer of particles the region into which the catalyst is metered.

As long as the density of the gas in the fluidized bed is significantly below the particle density, which is, in particular, the case at pressures up to 10 MPa, the pressure in the reactor likewise plays a negligible role. However, the lower the pressure in the reactor, the easier it is to generate a region of reduced density in the fluidized bed by means of a fluid. Preference is given to a pressure difference of 0.2-0.4 MPa (2-4 bar) between the metering pressure, i.e. the pressure under which the fluid is, and the reactor pressure.

While the metered addition of the catalyst is discontinuous according to the present invention, the introduction of the fluid stream (preblowing) can be carried out continuously or discontinuously, so that the catalyst is either metered into a continuously maintained region of reduced particle density in the fluidized bed, or the region of reduced particle density in the fluidized bed is formed discontinuously, in each case prior to each introduction of the catalyst. Here, the time between preblowing and the metered addition of the catalyst has to be selected so that there is sufficient time for the density-reduced region to be formed. In addition, in the case of discontinuous preblowing, the fluid stream either has to be maintained to the end of the addition of catalyst or the time between the end of the introduction of the fluid stream and the commencement of catalyst addition has to be sufficiently short for the region of reduced particle density not to have broken down again or been transported by means of the carrier gas from the region of the fluidized bed into which the catalyst is metered.

Preference is given to discontinuous preblowing. Particular preference is given to the fluid being introduced discontinuously for a period of from 0.5 to 60 s with a delay of from 0.5 to 3 s after the commencement of introduction of the fluid stream before the catalyst is metered in.

According to the present invention, the catalyst can be metered in by means of the same fluid stream used for preblowing, or with the aid of a further fluid stream. The catalyst is preferably metered into the reactor by means of the fluid stream itself. Preference is likewise given to the fluid stream being introduced into the fluidized bed essentially concentrically around the metering point for the catalyst and effecting introduction of the catalyst at the metering point by means of a further fluid stream.

Furthermore, the catalyst is preferably not metered in directly at the interior wall of the reactor but at a distance of at least 1 cm, particularly preferably from 2 to 100 cm, most preferably from 3 to 50 cm, from the interior wall of the reactor, by which means better distribution of the catalyst in the fluidized bed is achieved. The inert gas stream can likewise be introduced at a distance of at least 1 cm from the interior wall of the reactor, e.g. via a lance.

A further aspect of the present invention is a continuous polymerization process for preparing ethylene and propylene homopolymers and copolymers, in which ethylene, propylene or mixtures comprising ethylene or propylene and other $C_2$-$C_8$-$\alpha$-olefins are polymerized at from 30 to 150° C. and a pressure of from 0.5 to 6 MPa in the presence of a catalyst in a gas-phase fluidized-bed reactor containing a bed of finely divided polymer, with the above-described method being employed for metering in the catalyst and/or process auxiliary.

The present invention further provides an apparatus for carrying out the abovementioned process. This comprises a gas-phase fluidized-bed reactor containing a fluidized bed of particles in a reactor gas, where the reactor has a wall which is arranged essentially parallel to the flow direction of the reactor gas and bounds the fluidized bed. In addition, the apparatus comprises at least one reservoir unit for storing at least one catalyst and/or process auxiliary, a portioning unit for providing portions of the catalyst and/or process auxiliary in a prescribed amount, which is connected to the reservoir unit or units by a first connecting line, a valve unit for introducing the portions of catalyst and/or process auxiliary into the fluidized bed of the reactor at at least one metering point, where the valve unit is connected to the portioning unit by a second connecting line and is connected to the reactor at the metering point or points, and a fluid feed line through which a fluid, in particular an inert gas, can be fed to the reservoir unit and the second connecting line. The metering point or points is/are located at least 1 cm from the wall of the reactor, so that the catalyst is not metered into the wall region of the fluidized bed having reduced convection. Instead, the catalyst and/or process auxiliary is as far as possible metered into a region of the catalyst bed which is influenced or calmed by the interior wall of the reactor to only a very small extent, if at all.

The metering point is preferably located from 2 to 100 cm from the wall. The wall is preferably formed by a tubular reactor interior wall arranged vertically in space and the metering point advantageously extends radially from the reactor interior wall into the reactor or the fluidized bed.

In a preferred embodiment of the metering apparatus of the present invention, one or more fluid introduction points for the introduction of the fluid stream are provided essentially in the form of an annulus around the metering point for the catalyst.

The apparatus and method of the invention will be illustrated below for the metering of a polymerization catalyst with the aid of the figures, without the invention being restricted to these embodiments.

Figure 1:
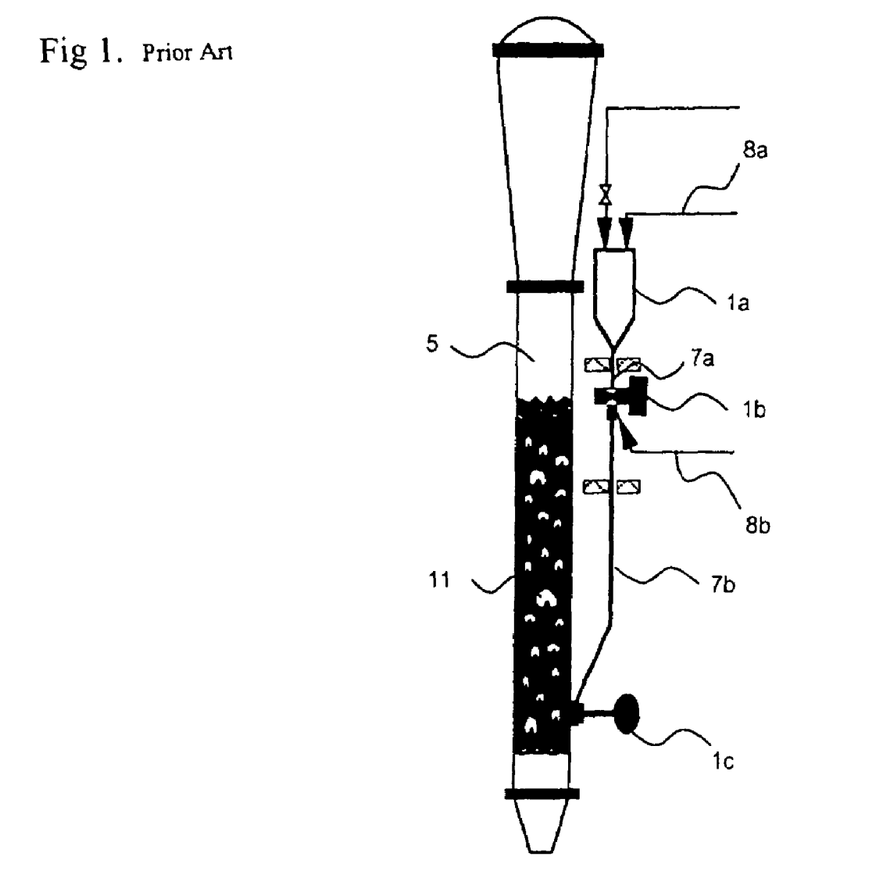
FIG. 1 schematically shows one embodiment of a metering apparatus.

FIG. 1 depicts an overview of a gas-phase fluidized-bed reactor for the polymerization of ethylene, which is provided with a metering apparatus which in principle corresponds to that described in EP 226 935 B1 and which can be used with small modifications for carrying out the method of the present invention. The metering apparatus comprises the elements reservoir unit 1$a$, portioning unit 1$b$ and valve unit 1$c$.

In general, a gas-phase fluidized-bed reactor 5 is a tube of varying length which is arranged vertically in space and through which circulated reactor gas flows. In general, the circulated reactor gas is fed in at the lower end of the gas-phase fluidized-bed reactor and is taken off again at its upper end. The fluidized bed 11 is bounded by the interior wall 9 of the reactor (cf. FIG. 4).

In the case of the polymerization of $\alpha$-olefins, the circulated reactor gas is usually a mixture of ethene or propene, if desired a molecular weight regulator such as hydrogen and inert gases such as nitrogen and/or saturated hydrocarbons such as ethane, propane, butane, pentane or hexane. In addition, the reactor gas can further comprise $C_3$-$C_8$-$\alpha$-olefins such as propene, 1-butene, 1-pentene, 2-$\alpha$-monoolefins such as propene, 1-butene, 1-pentene, 2-methylpentene, 1-hexene, 1-heptene and 1-octene as comonomers. Preference is given to a process in which ethylene is copolymerized with 1-hexene or 1-butene. The velocity of the reactor gas has to be sufficiently high to fluidize a thoroughly mixed bed of finely divided polymer which is located in the tube and serves as polymerization zone and, secondly, to remove the heat of polymerization effectively. To set constant reaction conditions, the constituents of the reactor gas can be fed directly into the gas-phase fluidized-bed reactor or via the circulated reactor gas.

Furthermore, the amount of catalyst metered in determines the product output of the gas-phase fluidized-bed reactor. Its capacity is known to be limited by the cooling capacity of the circulated reactor gas. This cooling capacity depends, firstly, on the pressure of the reactor gas or at which the (co)polymerization is carried out. It is generally advisable to work at pressures of from 0.1 to 10 MPa, preferably from 1 to 8 MPa and in particular from 1.5 to 5 MPa. In addition, the cooling capacity depends on the temperature at which the (co)polymerization in the fluidized bed is carried out. In the process of the present invention, it is advantageous to employ temperatures of from 30 to 125° C., particularly preferably from 75 to 118° C., with temperatures in the upper part of this range preferably being set for copolymers of relatively high density and temperatures in the lower part of this range preferably being set for copolymers of relatively low density.

Apart from the temperature, the proportion of inert gases such as nitrogen or inert hydrocarbons has an influence on the risk of occurrence of conglutination and deposits. High proportions of inert gas can reduce the risk of deposits, but at the same time can adversely affect the space-time yield as a result of low catalyst productivities, so that the process can become uneconomical. In the process of the present invention, the proportion of inert gas is preferably from 15 to 75% by volume, particularly preferably from 35 to 50% by volume, based on the total volume of the reaction gas.

Figure 2:
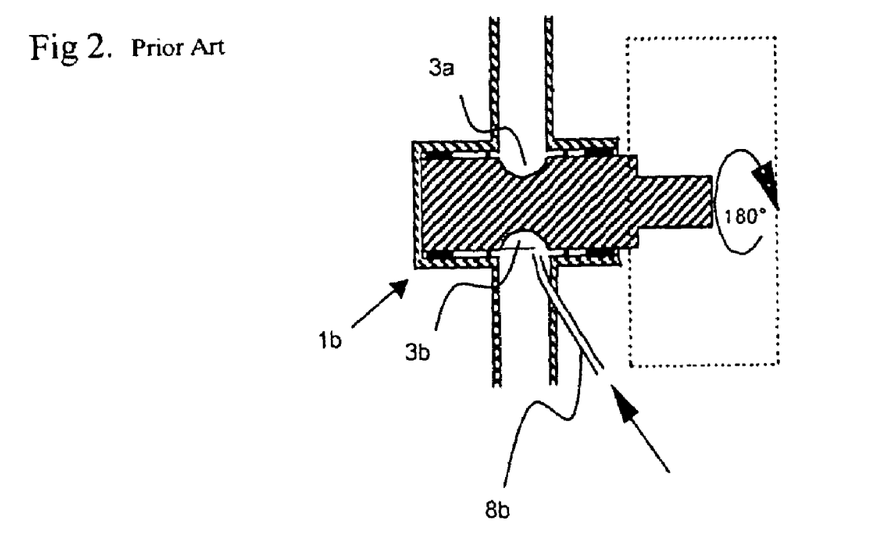
FIG. 2 shows an embodiment of the portioning unit of the metering apparatus shown in FIG. 1.

FIG. 2 shows a detail of the portioning unit 1b. It forms a shaft 2 which is sealed in a housing by means of sealing rings and glands and can be alternately rotated through 180° and is provided with two depressions 3a and 3b on opposite sides. The alternating motion is achieved by means of a drive which is not shown. As an alternative to the depicted portioning unit 1b with two depressions 3a, 3b opposite one another, it is possible to provide only one depression. This can be significantly deeper, so that larger metered amounts can be achieved at the same shaft diameter.

Figure 3:
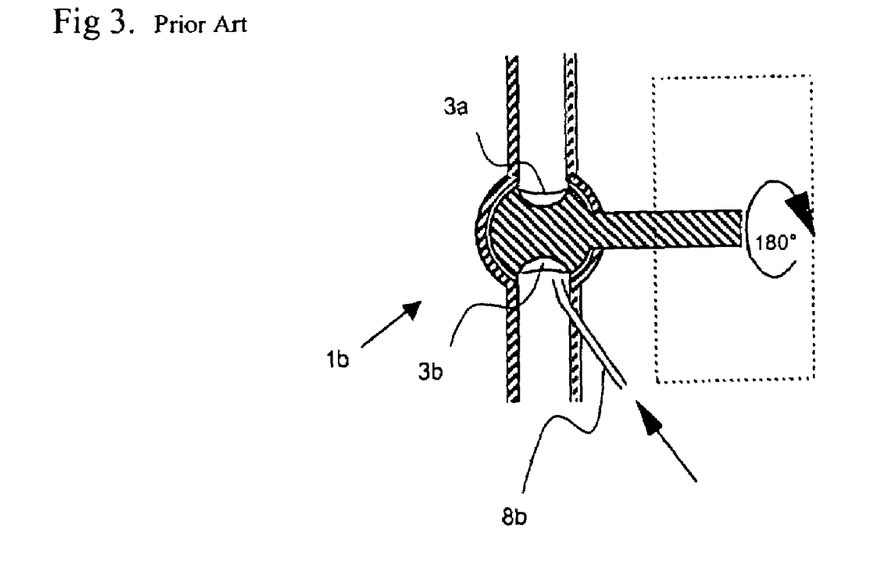
FIG. 3 shows a further embodiment of the portioning unit of the metering apparatus shown in FIG. 1.

FIG. 3 shows an alternative embodiment of the positioning unit 1b. It can be made from a commercial ball valve by replacing the inner part with a through hole by an inner part having the depressions 3a, 3b. Instead of a ball valve, it is also possible to use a valve with a plug.

Figure 4:
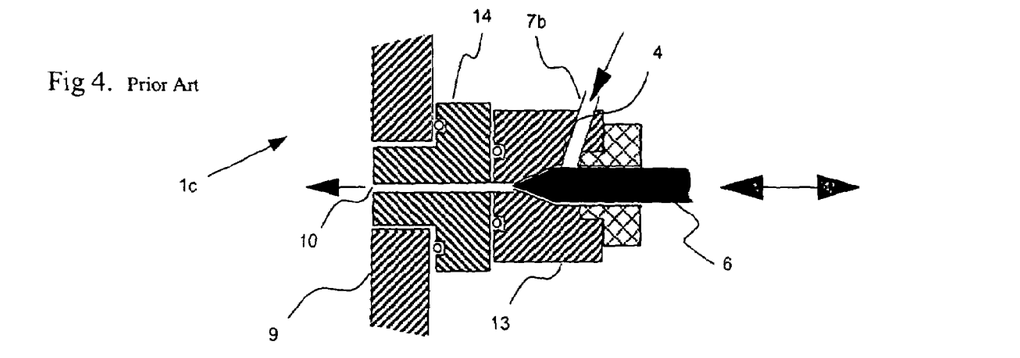
FIG. 4 shows a first embodiment of the valve unit of the metering apparatus shown in FIG. 1.
Figure 5:
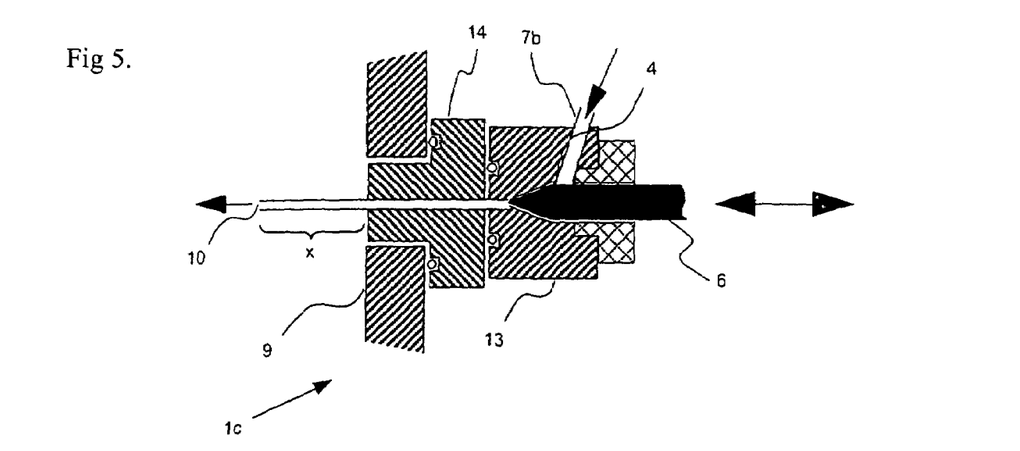
FIG. 5 shows a second embodiment of the valve unit of the metering apparatus shown in FIG. 1 with a metering point projecting beyond the interior wall of the reactor.

FIG. 4 shows a first embodiment of the valve unit 1c. This comprises the actual nozzle 13 and a flange 14 which is provided with a cylindrical hole and is located between the nozzle 13 and the reactor 5. The valve unit 1c is connected to the reactor 5 in a gastight manner. This nozzle 13 forms a cylindrical hollow space 4 which is sealed by means of sealing rings and a gland and runs in a nozzle shape in the direction of the reactor 5 which is under a pressure of from about 1.5 to 5 MPa. In this hollow space 4, there is arranged a spindle 6 which is positioned concentrically with the hollow space 4 and the nozzle-shaped inlet and can be moved back and forth by means of a drive, with the spindle 6 in the zero position closing off the nozzle and thus the entire metering space in an absolutely gastight manner against the flange 14 and the reactor 5. The flange 14 serves to achieve very uniform and deep penetration of the fluid stream during preblowing by preventing radial spreading-out of the fluid behind the nozzle and ensuring that a parallel fluid jet can be formed.

Between the reservoir unit 1a and the portioning unit 1b on the one hand and the portioning unit 1b and the valve unit 1c on the other hand there are connecting lines 7a and 7b. The reservoir unit 1a and the connecting line 7b are equipped with feed lines 8a and 8b for inert gas in which the pressure is higher than the pressure in the reactor 5, with the absolute value of this pressure being adjustable.

The valve unit 1c can be arranged flush with the interior wall 9 of the reactor as described in EP 226 935 B1 and depicted in FIG. 4. Since little turbulence is observed at the wall, the metering point 10 of the valve unit 1c can, in one variant, project a distance x of from 1 to 100 cm, preferably from 3 to 50 cm, beyond the interior wall 9 of the reactor into the interior of the reactor, preferably in a radial direction, which leads to introduction of the catalyst occurring at a greater distance from the interior wall 9 of the reactor and thus into a region of the fluidized bed having high turbulence. This enables better and more rapid dispersion of the catalyst in the fluidized bed and thus more uniform operation of the reactor. The distance x depends on the reactor diameter and on the turbulence of the fluidized bed. While advantageous effects can be achieved by a distance of 1 cm in the case of relatively small and relatively turbulent reactors, in the case of production reactors it can be more advantageous to choose, for example, a distance of 50 cm.

The method of the present invention is explained below for use of the discontinuous metering apparatus described above in FIGS. 1, 2, 4 and 5, but it is emphasized that the method can also be carried out using other apparatuses. The valve unit 1c opens the connection between the metering space, which is formed by the hollow space 4 and the lines 7b and 8b, and the reactor 5 so that the inert gas, which is under superatmospheric pressure, can flow into the reactor as a result of the pressure drop. Here, the inert gas effectively introduces a gas bubble, i.e. an essentially particle-free region, into the fluidized bed (preblowing). After a few seconds, delay, the shaft 2 of the portioning unit 1b is rotated through 180°, which results in the respective catalyst-filled depression 3a, 3b being connected to the metering space. The catalyst is blown into the gas bubble by means of the inert gas and becomes distributed uniformly over the bubble wall. After about two to ten seconds of opening time, the valve unit 1c closes again. The length of the delay time and the opening time of the valve unit 1c can be varied and depends essentially on the geometry of the reactor used, the reaction conditions, the gas velocity, the density of the fluidized bed and the throughput. The delay time is normally in the range from 0.5 to 10 s, preferably from 1 to 2 s. A decisive factor is that the addition of the catalyst is carried out after a delay which allows the formation of a stable, essentially particle-free region in the fluidized bed into which the catalyst is introduced. The opening time of the valve unit 1c has to be selected so that the amount of catalyst present in the depression 3a, 3b goes into the reactor 5 with each metering operation.

In contrast, the method of the prior art proceeds as follows: the shaft 2 of the portioning unit 1b is firstly rotated through 180°, which results in the respective catalyst-filled depression 3a, 3b being connected to the metering space and the catalyst drops in front of the valve unit 1c. Only then does the valve unit 1c open the connection between the metering space and the reactor 5, so that the inert gas, which is under superatmospheric pressure, conveys the catalyst into the reactor 5. After an opening time of from 0.1 to 30 seconds, the valve unit 1c closes again.

Figure 6:
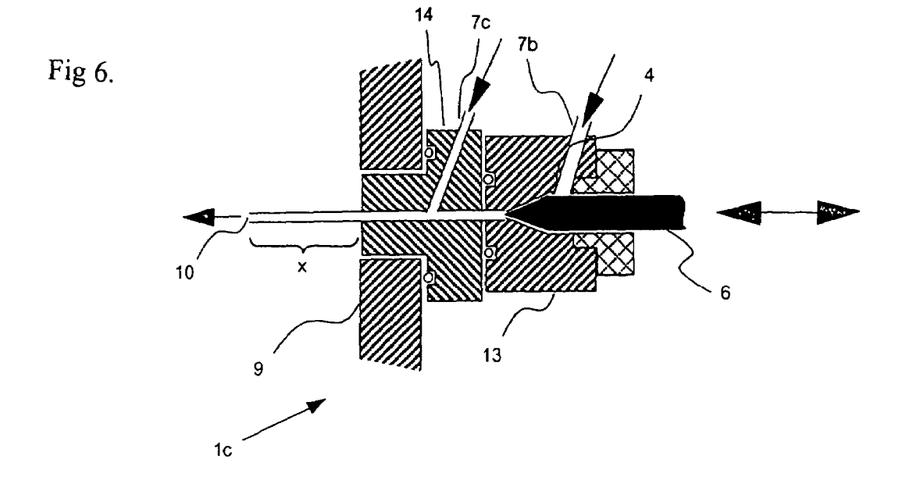
FIG. 6 shows a third embodiment of the valve unit of the metering apparatus shown in FIG. 1 with a metering point projecting beyond the interior wall of the reactor and additional preblowing of fluid.

A further embodiment of the metering apparatus is shown in FIG. 6, in which nitrogen or another inert gas can additionally be fed into the valve unit 1c via the connecting line 7c in order to increase the inert gas flow. In this variant, the formation of the gas bubble during preblowing can be improved by the additional inert gas flow, which is particularly advantageous when the fluidized bed has a relatively high density. The additional inert gas stream can either be completely shut off or maintained at smaller gas flows during the subsequent introduction of the catalyst. Furthermore, continuous preblowing can be brought about in a simple manner.

Figure 7:
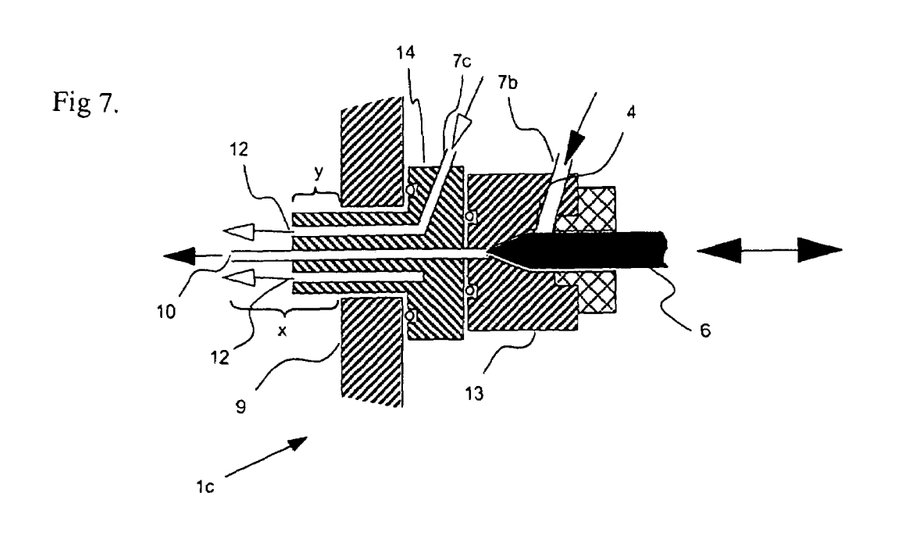
FIG. 7 shows a fourth embodiment of the valve unit of the metering apparatus shown in FIG. 1 with a metering point projecting beyond the interior wall of the reactor and introduction of fluid in an annulus around the metering point.

The variant of the valve unit which is shown in FIG. 7 likewise has a metering point 10 which projects beyond the reactor wall 9. In addition, an inert gas metering point 12 which likewise projects beyond the reactor wall 9 is provided for preblowing of nitrogen. The inert gas metering point 12 and the metering point 10 are formed by concentric tubes through which the inert gas or, if desired, another fluid and the metered addition of the catalyst occurs. The open end of the inner tube facing the interior of the reactor forms the metering point 10 of the catalyst, while the inert gas is passed into the reactor 5 through the outer tube. The inert gas metering point 12 is configured as an annulus in this case. As a result of this arrangement, introduction of the inert gas creates a relatively large particle-free region into which the catalyst is subsequently metered, likewise with the aid of inert gas. Apart from an annular configuration of the inert gas metering point 12, it is also possible for a plurality of, for example, ring-segment-like or round metering points to be arranged in a ring around the metering point 10.

All embodiments can be operated with the aid of an inert gas such as nitrogen. However, metering can also be carried out using other inert fluids such as propane which are in liquid form in the lines 7b and 8b but vaporize immediately in the reactor 5 after passing through the valve unit 1c. Preblowing by means of propane and catalyst metering by means of nitrogen is also possible.

When propane is used, it is also advantageous to operate the reactor using only propane as inert component in the circulated gas. Using propane instead of nitrogen in the circulated gas increases the heat capacity of the circulated gas and the gas density. In this way, the production rate of the reactor can be increased by up to 40% in comparison to operation using nitrogen as inert component at the same temperature difference between reactor inlet temperature and reactor outlet temperature.

Figure 8:
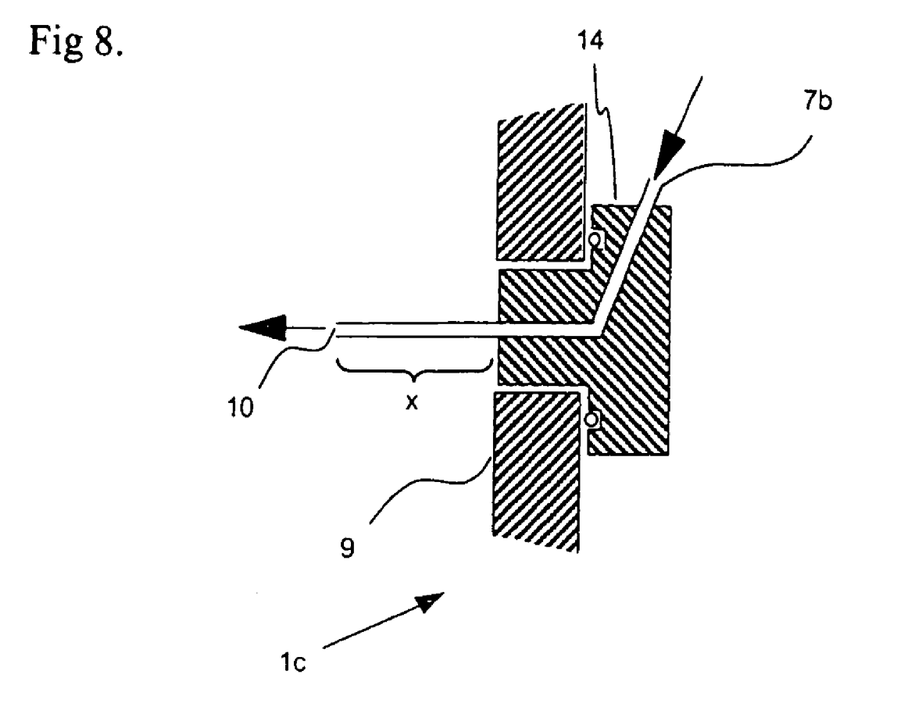
FIG. 8 shows an embodiment of a metering apparatus without a valve unit for continuous preblowing.

A further embodiment of the metering apparatus is shown in FIG. 8. The metering point 10 is at a distance of at least 1 cm from the interior wall of the reactor. The depicted variant of the metering apparatus is operated exclusively with continuous preblowing. The valve unit 1c is omitted in this case. The continual stream of inert fluid prevents intrusion of the gas from the reactor 5 into the metering space. As inert fluid, preference is given to using nitrogen or propane. The propane is in liquid form in the lines 7b and 8b, and vaporizes at the metering point under the conditions prevailing in the reactor and thus forms a gas bubble, i.e. an essentially particle-free zone, in the fluidized bed.

The present invention has been illustrated with the aid of five embodiments of advantageous metering apparatuses. However, it must be emphasized that the invention is not restricted to these. Rather, other metering apparatuses which make it possible to carry out preblowing by means of inert gas or another fluid can also be used for performing the present invention.

EXAMPLE 1

An HDPE product having a density of 0.950 g/cm$^3$ and 0.956 g/cm$^3$ and a melt flow rate MFR (190° C./2.16 kg) of 0.3 g/10 min, determined in accordance with ISO 1133, was in each case prepared in a gas-phase fluidized-bed production reactor at an output of 20 t/h, a reactor temperature of 115.5° C. and a reactor pressure of 2.1 MPa (21 bar). As catalyst, use was made of a titanized chromium catalyst (silica gel support, particle size: 50 μm).

The catalyst was metered in using the metering apparatus depicted in FIGS. 1 to 3 and the novel metering method described for this using nitrogen as fluid for preblowing and for metering in the catalyst. The delay time was 2 s, and the total opening time of the valve unit was 10 s.

After changing over to the metering method of the present invention, no temperature rises due to hot spots or deposits on the temperature probes were observed over a period of 20 days, while metering according to the prior art resulted in temperature rises at the temperature probes occurring within 3 days and leading to shutdown of the reactor. Surprisingly, a productivity increase of from 15 to 20% was found when using the metering method of the present invention.

EXAMPLE 2

Polyethylene having a density of 0.937 g/cm$^3$ or 0.942 g/cm$^3$ and a melt flow rate MFR (190° C./21.6 kg) of 6 or 12 g/10 min, determined in accordance with ISO 1133, was prepared in a gas-phase fluidized-bed production reactor at an output of 25 t/h, a reactor temperature of 113 or 114.5° C. and a reactor pressure of 2.1 MPa (21 bar). As catalyst, use was made of a chromium catalyst (silica gel support).

The catalyst was metered in using the metering apparatus depicted in FIGS. 1, 2 and 4 and the novel metering method described for this using nitrogen as fluid for preblowing and for metering in the catalyst. The delay time was 2 s, and the total opening time of the valve unit was 10 s.

After changing over to the metering method of the present invention, the catalyst productivity rose by from 10 to 15%.

EXAMPLE 3

Polyethylene having a density of 0.918 g/cm$^3$ and a melt flow rate MFR (190° C./2.16 kg) of 1-4 g/10 min, determined in accordance with ISO 1133, was prepared in a gas-phase fluidized-bed pilot plant reactor at an output of 55 kg/h, a reactor temperature of from 85 to 92° C. and a reactor pressure of 2.1 MPa (21 bar). As catalyst, use was made of a highly active metallocene catalyst supported on silica gel.

When using the metering method of the prior art with nitrogen for metering in the catalyst, lumps with catalyst inclusions and deposits on the reactor wall occurred within 24 hours as a result of hot spots. Lumps and deposits led to shutdown of the reactor.

When the metering apparatuses depicted in FIGS. 1, 2 and 4 and the metering method described for this using nitrogen as fluid for preblowing and for metering in the catalyst were employed, the process could be operated using the same highly active metallocene catalyst supported on silica gel without lumps or deposits on the reactor wall occurring.

EXAMPLE 4

Polyethylene having a density of 0.937 g/cm$^3$ and a melt flow rate MFR (190° C./21.6 kg) of 11-13 g/10 min, determined in accordance with ISO 1133, was prepared in a gas-phase fluidized-bed pilot plant reactor (0.5 m reactor diameter) at an output of 60 kg/h, a reactor pressure of 2.1 MPa and a reactor temperature of 113° C. As catalyst, use was made of a chromium catalyst (silica gel support, mean particle diameter: 50 μm).

When the metering apparatus depicted in FIG. 8 was employed and operated using propane and nitrogen was replaced by propane as inert component in the reactor gas, the reactor could be operated without problems for a week.

Compared to operation using nitrogen and metering without preblowing, a 10-15% higher productivity and a temperature difference between reactor inlet and reactor outlet reduced by 40% were found at the same ethylene partial pressure.

LIST OF REFERENCE NUMERALS

1a Reservoir unit
1b Portioning unit
1c Valve unit
2 Shaft
3a, 3b Depressions
4 Hollow space
5 Reactor
6 Spindle
7a, 7b Connecting line
8a, 8b Feed lines
9 Interior wall of reactor 10 Metering point
11 Fluidized bed
12 Inert gas metering point
13 Nozzle
14 Flange

We claim:

1. A method comprising metering discontinuously at least one solid, particulate catalyst and/or process auxiliary into a reactor (5) containing a fluidized bed (11) of particles in an at least partly gaseous medium at prescribed time intervals into the fluidized bed (11) at least one metering point (10), wherein a first fluid stream is in each case introduced into the reactor (5) so that a region having a reduced particle density is formed in the fluidized bed (11) around the at least one metering point (10) and the at least one solid, particulate catalyst and/or process auxiliary is subsequently metered into the region having a reduced particle density, and wherein the first fluid stream is introduced discontinuously for a period of from 0.5 to 60 s and the catalyst is metered in after a delay of from 0.5 to 3 s after commencement of the introduction of the first fluid stream.

2. The method as claimed in claim 1, wherein the first fluid stream is a gas stream.

3. The method as claimed in claim 1, wherein the first fluid stream is a liquid stream that vaporizes under the conditions prevailing in the reactor (5).

4. The method as claimed in claim 1, wherein the region having a reduced particle density has a particle density of less than 0.1 g/cm$^3$.

5. The method as claimed in claim 4, wherein the region having a reduced particle density is substantially free of particles.

6. The method as claimed in claim 1, wherein the at least one solid, particulate catalyst is a free-flowing catalyst suitable for the polymerization of α-olefins.

7. The method as claimed in claim 1, wherein the first fluid stream is formed by at least one inert gas selected from the group consisting of $C_2$-$C_3$-alkanes and $N_2$.

8. The method as claimed in claim 1, wherein the catalyst is introduced at a distance (x) of at least 1 cm from an interior wall (9) of the reactor (5).

9. The method as claimed in claim 1, wherein the catalyst is introduced into the reactor (5) by means of the first fluid stream.

10. The method as claimed in claim 1, wherein the first fluid stream is introduced into the reactor (5) essentially concentrically around the at least one metering point (10) for the catalyst and the catalyst is introduced at the at least one metering point (10) with the aid of a second fluid stream.

11. The method as claimed in claim 10, wherein the first fluid stream is introduced at a distance (y) of at least 1 cm from the interior wall (9) of the reactor (5).

12. The method as claimed in claim 4, wherein the region having the reduced particle density has a particle density less than 0.01 g/cm$^3$.

* * * * *